Aug. 31, 1943.                C. G. DOTY                 2,328,064
                      STEERING RELEASE MECHANISM
                       Filed Nov. 7, 1941          3 Sheets-Sheet 1
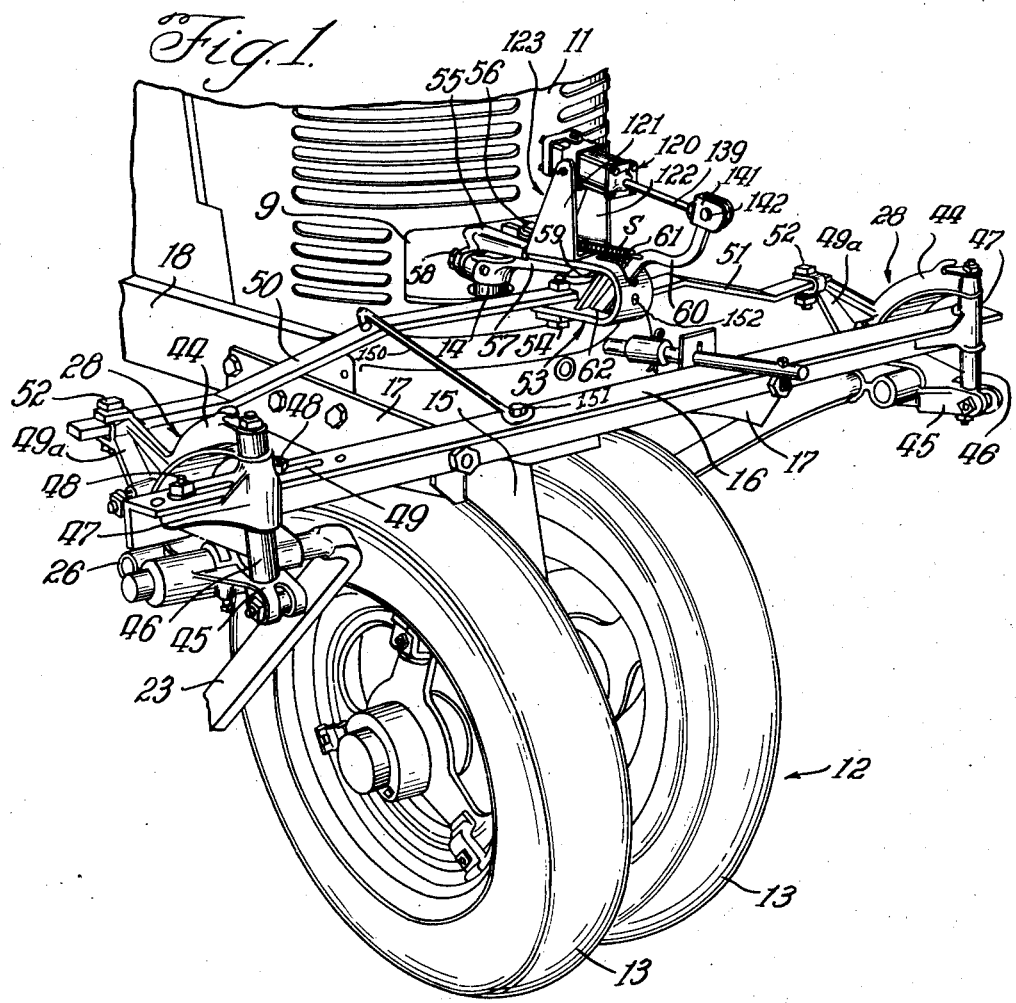
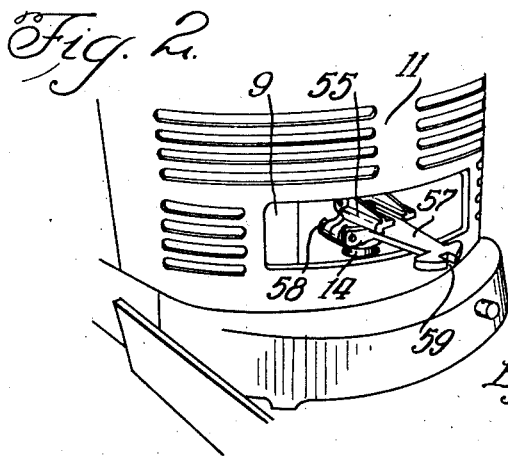
Inventor:
Cecil G. Doty

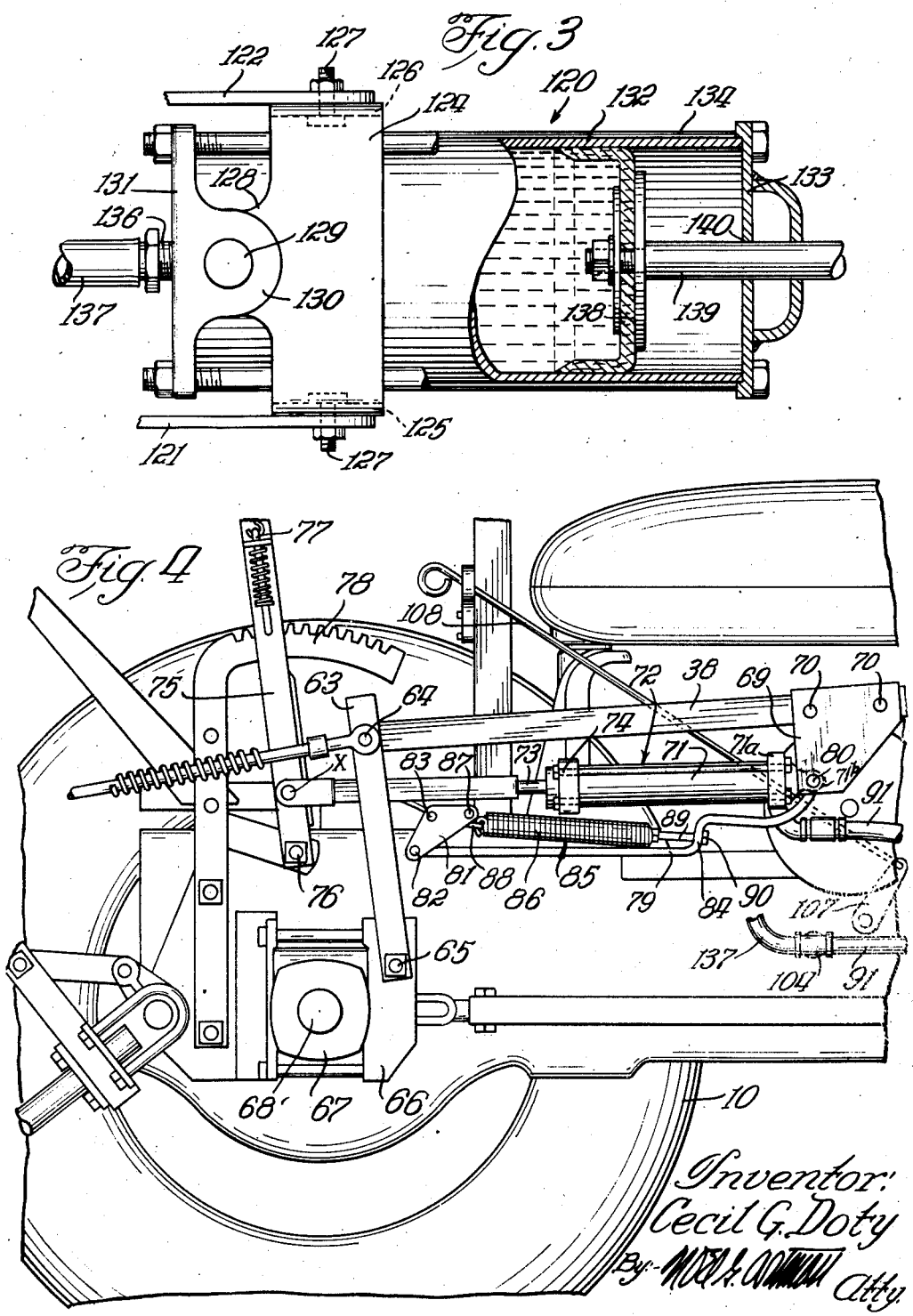

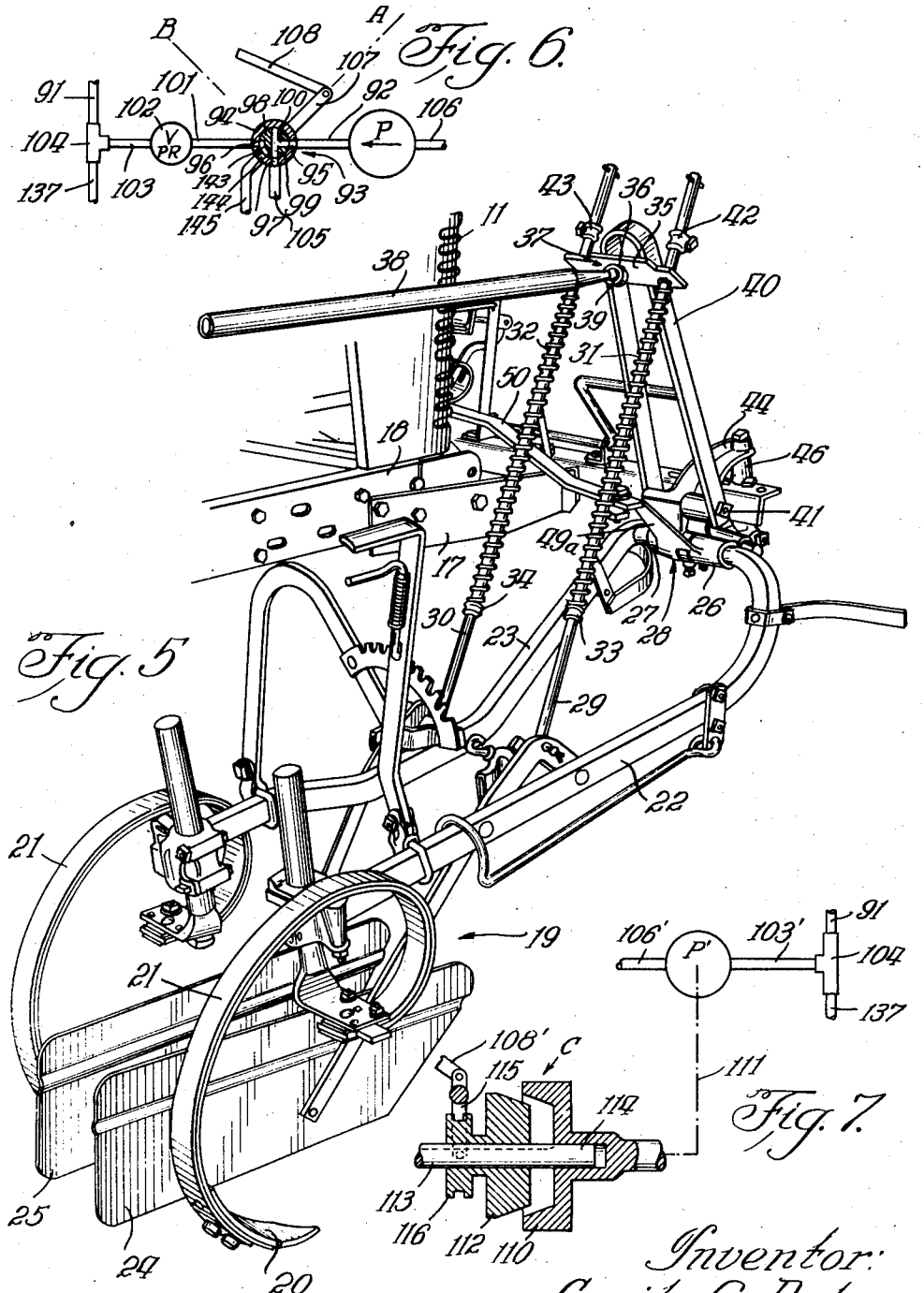

Patented Aug. 31, 1943

2,328,064

UNITED STATES PATENT OFFICE 2,328,064

STEERING RELEASE MECHANISM

Cecil G. Doty, Crown Point, Ind.

Application November 7, 1941, Serial No. 418,122

8 Claims. (Cl. 97—47)

This invention has to do with dirigible agricultural machines having a crop cultivating instrumentality connected with steering mechanism of the machine whereby the instrumentality can be adjusted relatively to the crop by steerage manipulation of the mechanism as the machine advances across a field, and relates more particularly to a novel structure for quickly releasing the connection between said instrumentality and said steering mechanism.

In contemporary machines of this general class the connection between the steering mechanism and the cultivating instrumentality is such that the movement of said instrumentality relatively to the crop is large in comparison to change in direction of the machine pursuant to steerage manipulation of this mechanism so that the instrumentality can be guided quickly into proper relation with respect to irregularly positioned stalks and the like without incurring significant veerage of the machine from its general course. This connection between the cultivating instrumentality and the steering mechanism is made releasable so it can be disabled to avoid trammeling extreme manipulations of the steering mechanism as when turning the machine around at the end of a crop row. Power operated means is also employed in these contemporary machines for lifting the cultivating instrumentality from the cultivating zone in the soil, and there is also means actuated by this power-operated means for releasing the connection between said instrumentality and the steering mechanism. In the operation of these machines, when the end of a crop row is approached, the operator throws a control, setting the power-operated means in operation for lifting the instrumentality from the cultivating position or zone and consequently causing the releasing means to release the connection between the steering mechanism and the cultivating instrumentality. The means for releasing this connection is dependent upon operation of the power-operated means and in fact is not effective for releasing the connection until after substantial displacement of the cultivating instrumentality from the cultivating zone, and, since the mass of said instrumentality is sufficient that it is displaced rather slowly, displacement of the instrumentality must be begun before the end of the crop row is reached wherefore said connection will be released in time to free the steering mechanism so it can be manipulated the necessary amount for executing the turning about. This premature lifting of the cultivating instrumentality from the cultivating zone renders the machine inoperable to cultivate all of the crop row, wherefore uncultivated areas will remain adjacent to each end of the field and which areas must be cultivated by several supplementary traversals laterally of the field.

It will be understood, however, that this auxiliary time-consuming task of lateral cultivation can be done only if the field is check-row plated, and even then there will be smaller areas in the field corners that cannot be cultivated by the machine.

The general object of this invention is the provision, in a machine of the present class, of an improved arrangement of cultivating instrumentality and means for connecting the same with steering mechanism of the machine whereby steerage manipulation of such mechanism will cause adjustment of the instrumentality within a cultivating zone, together with power operated means for displacing or lifting the instrumentality from said zone and for demobilizing the connection between steering mechanism and said instrumentality promptly upon the throwing of a control for initiating operation of the power-operated means.

Another object of the invention is the provision of an improved power-operated apparatus involving separate fluid-pressure responsive motors for respectively displacing the cultivating instrumentality of a machine as the aforesaid from the cultivating zone and disconnecting such instrumentality from the steering mechanism, and a common control manipulatable to cause operation of the motor associated with the steering connection for releasing this connection pursuant to the manipulation of said control for initiating operation of the other motor.

An additional object of the present invention is the provision of power-operated apparatus according to the next preceding object and wherein the motors are connectible in parallel with a source of actuating fluid by the common control, and the power of said motors is such relatively to their respective loads that the motor associated with the connection between the steering mechanism and the cultivating instrumentality operates prior to the other motor.

Still a further object of the invention is the provision of an improved fluid-pressure responsive motor mount and latch structure operable thereby for disconnecting the connection between the machine steering mechanism and the cultivating instrumentality.

The above and other desirable objects inherent in and encompassed by the invention will become apparent when fully understanding the preferred embodiment thereof hereinafter described and shown in the accompanying drawings, wherein:

Fig. 1 is a front perspective fragmentary view of a machine having mounted thereon cultivator instrumentality control apparatus constructed in accordance with the principles of the present invention;

Fig. 2 is a fragmentary respective view illustrating the upper end of the steering wheel spindle and parts of a latch mechanism associated therewith;

Fig. 3 is an enlarged plan view of a fluid-pressure responsive motor, also shown in Fig. 1, together with a universally pivotal support therefor, for disengaging the latch mechanism which constitutes part of the operating connection between the machine steering mechanism and cultivating instrumentalities;

Fig. 4 is a side elevational view of a rear portion of the machine, parts being broken away for clarity, illustrating the back portion of a power-operated structure for lifting the cultivating instrumentality from the cultivating zone;

Fig. 5 is a perspective view complemental with Fig. 4 and showing a cultivating instrumentality together with its association with the power-operated assembly shown in Fig. 4, this view also showing a part of the structure operatively connecting the instrumentality with the steering mechanism of the machine;

Fig. 6 is a diagrammatic view illustrating a pump for supplying fluid under pressure and a control by means of which the pressure of such fluid is controlled in its application to power-operated means for lifting the cultivating instrumentality from the cultivating zone and for unlatching the connection between the steering mechanism and the cultivating instrumentality; and Fig. 7 is a diagrammatic view of a modified form of apparatus employable in lieu of that shown in Fig. 6.

Referring now to the drawings, the machine upon which the invention is installed for illustration is seen to comprise a tractor of which the forepart is shown in Figs. 1 and 5 and of which the rear part, together with one of the driving wheels, 10, is shown in Fig. 4. The forepart of the tractor which includes a radiator grille 11 is supported upon a guiding wheel assembly 12 of dual-wheel structure wherein there are wheels 13. The axle for the wheels 13 is connected with an upright spindle 14 which is enclosed in a housing 15 below the grille 11 and of which a section is visible in each of Figs. 1 and 2 through an opening 9 in said grille. Steering gear means of conventional structure (not shown) is employed for oscillating the spindle 14 and thereby oscillating the wheels 13 to impart guiding movement thereto.

A cross beam 16 of angle iron is supported at the front end of the tractor upon a pair of forwardly extending arms 17 bolted to respective side frame members 18. Cultivating instrumentalities of which one is generally designated 19 in Fig. 5 are attached respectively at opposite end portions of the cross bar 16. These cultivating instrumentalities, in the present instance, are for tilling the soil adjacently to and upon each side of a crop row and comprise cultivator shovels 20 supported at the lower end of arcuate spring members 21. Each instrumentality has two spring members 21 of which one is mounted at the back end of a beam 22 whereas the other is mounted at the back end of a beam 23. Crop shield members 24 and 25 are also mounted upon the back ends of the beams 22 and 23 for shielding the crop plants in a row therebetween from soil thrown by the shovels 20. The beams 22 and 23 are pivotally mounted in bearings 26 and 27 of a steering knuckle member 28 to facilitate lifting and lowering of the shovels 20 from and into the cultivating zone where they engage the soil, and also to facilitate vertical adjustment of the instrumentalities whereby the depth of the shovels 20 may be regulated in the soil.

A pair of pressure rods 29 and 30 are connected respectively at their lower ends to the beams 22 and 23 and constitute part of apparatus for adjusting the depth at which the shovels 20 operate and for lifting the cultivating instrumentalities from the cultivating zone. The pressure rods 29 and 30 are surrounded by long helical springs 31 and 32 which abut at their lower ends against stop members 33 and 34 secured to the rods at selective positions axially thereof. The upper ends of the springs 31 and 32 abut against a plate 35 which has upon its under face a socket part 36 of a ball-and-socket joint 37. A thrust rod 38 has upon its forward end a ball portion 39 constituting the other part of said joint 37. Said plate 35 is mounted upon the upper end of a U-shaped bracket 40 pivotally carried at its lower end upon the steering knuckle 28 where it is mounted upon a bolt 41. It will be seen therefore that should the thrust rod 38 be pulled backwardly or to the left as viewed in Fig. 5, the bracket 40 will constrain the plate 35 to follow an arcuate path backwardly and downwardly whereby the springs 31 and 32 are compressed for yieldably urging the cultivating instrumentality downwardly for causing the shovels 20 to operate at greater depth in the soil.

There is also provided a second pair of stop members 42 and 43 upon upper end portions of the pressure rods 29 and 30 and it will be seen that when the thrust rod 38 is moved endwise forwardly that the plate 35 will slide along said rods 29 and 30 until it abuts these stop members, and as the plate 35 moves forwardly in the arcuate path in which it is constrained to move by the bracket 40 the rods 29 and 30 together with the cultivating instrumentality will be lifted upwardly for lifting the shovels 20 from the cultivating zone.

Power-operated means for moving the thrust rod 38 endwise forwardly for displacing the cultivating instrumentalities from the cultivating zone is illustrated in Figs. 4, 6 and 7. Referring now to Fig. 4 the back end of the thrust rod 38 is shown pivotally connected with an upper end portion of a pivoted support arm 63 therefor by means of a pin or bolt 64. The pivoted arm 63 consists of a U-shaped strap of which the lower free ends are pivotally carried upon a bolt 65 mounted in a clamp member 66 clamped upon a housing 67 for the rear axle 68. A bracket 69 is connected by carriage bolts 70 with an intermediate section of the thrust rod 38 and serves as a connection therefor with the front end of the cylinder part 71 of a fluid-pressure responsive motor 72. The cylinder head 71a of the cylinder 71 is provided with an apertured lug 71b which is pivotally secured to the bracket 69 by a bolt 80. A piston (not shown) in the cylinder 71 is connected with a piston rod 73 slidably contained in a back cylinder head 74, and the piston rod is pivotally connected by a pin X with a hand operated lever 75. Said lever 75 is pivotally mounted at its lower end upon a bolt 76 suitably anchored upon the machine. Normally pivotal movement of the hand operated lever 75 is prevented by a latch member 77 thereon while engaged with one of the notches in a cooperating segment 78. The front end of a bent rod 79 is pivotally connected with the bracket 69 by the bolt 80 whereas the back end of said rod is pivotally connected with an end of a quadrant-shaped lever 81 by a bolt 82. Said lever 81 is pivotally anchored to the machine by a bolt 83. The opposite end of the lever 81 is connected with a mid-section 84 of the rod 79 by a distendable device 85 consisting of a helical contraction spring 86 having one of its ends attached to a bolt 87 in the lever 81 by a hook 88 and its forward end connected with said intermediate rod section 84 by a threaded stem 89 and a nut 90 upon said stem. Forward movement of the thrust rod 38 and with it the bracket 69 and the rod 79 will cause the lever 84 to pivot counter-clockwise upon its pivotal anchorage 83 while the bolt 87 and intermediate section 84 of said rod 79 move respectively backwardly and forwardly while distending the spring 86. Thus the spring 86 is conditioned for urging the thrust rod 38 backwardly following forward endwise movement thereof.

Forward movement of the rod 38 against the resistance of the spring 86 and the force of gravity upon the cultivating instrumentality is effected by introducing pressure fluid into the motor cylinder 71 through a conduit 91. Fluid thus introduced into the motor 72 reacts between the front cylinder head 71a and the piston (not shown) in the cylinder 71, causing the cylinder to move forwardly while the fluid expands the space between the said cylinder head and said piston, the piston and piston rod 73 reacting against the hand lever 75. Thus the bracket 69 and the thrust rod 38 are moved forwardly to cause displacement of the cultivator instrumentality associated therewith from the cultivating zone as explained above.

In Fig. 6 I have illustrated, as a source of pressure fluid, a pump P which may be driven from the engine crankshaft (not shown) of the machine. The output side of the pump may be connected through a conduit 92 with a valve 93 having a casing 94 provided with an inlet port 95 and discharge ports 96 and 97. Valve core 98 is provided with a diametric channel 99 and a lateral channel 100 which are communicative. The outlet port 96 discharges through a conduit 101, a pressure release valve 102, a conduit 103, a T-coupling 104 and said conduit 91 to the motor 72. When the valve core 98 occupies the position shown in Fig. 6 the fluid delivered from the pump passes successively through the conduit 92, inlet port 95, lateral channel 100, diametric channel 99, discharge port 97 and a conduit 105 which discharges into a fluid supply (not shown) with which the inlet side of the pump is connected through a conduit 106. Normally the valve core will be in the position shown in Fig. 6 but is rotatable by a control lever 107 connected therewith, and when this lever is rotated counter-clockwise from the position A to position B by manipulation of a hand operated control rod 108, Figs. 4 and 6, the diametric channel 99 will be placed communicatively between the ports 95 and 96 whereby the delivery from the pump will be through the valve, the conduit 101, pressure release valve 102, conduit 103, coupling 104 and the conduit 91 for operating the motor 72. The control rod 108 has its upper and back end within convenient reach of the operator, as illustrated in Fig. 4.

Instead of the pump and the valve arrangement illustrated in Fig. 6, that illustrated in Fig. 7 may be used. In this latter arrangement the pump P' which corresponds to the pump P has its discharge side connected with the T-coupling 104 through the conduit 103', and its intake connected with a source of low pressure fluid through a conduit 106'. The pump P' is driven from the driven member 110 of a friction clutch C by a mechanical connection represented by the dot-dash line 111. The driving member 112 of the clutch C is keyed to a drive shaft 113 which has an end journalled at 114 in the clutch driven member 110. Said shaft 113 may be driven from the machine engine in any well-known manner. Normally the pump P' does not operate, but when the control stem 108', corresponding to the stem 108 is pulled upon by the operator, a shifter fork 115 will be pivoted for causing movement of a grooved shifter ring 116 associated therewith and of the driven member 112 of the clutch C forwardly to frictionally engage the parts 112 and 110 whereby the pump P' is operated to deliver operating fluid to the motor 72 and thus cause displacement of the cultivating instrumentalities from the soil.

In Figs. 1, 2 and 5 apparatus now to be described is shown for adjusting the cultivating instrumentalities laterally. Upper and lower legs 44 and 45, Figs. 1 and 5, of the steering knuckle members 28, will be seen to straddle the cross beam 16 and to be journalled upon opposite ends of vertical spindles 46 respectively carried within brackets 47, and these brackets 47 are secured to the cross beam in a manner adapting them to be adjusted lengthwise thereof and by any standard means such as bolts 48 inserted through elongated openings 49 in the horizontal flange of said cross beam. By thus adjusting the brackets 47 lengthwise of the beam 16 the spacing of the cultivating instrumentalities can be changed for the cultivation of crop rows spaced apart different distances.

Each steering knuckle member 28 has a backwardly projecting arm 49a to the ends of which the outer ends of tie rods 50 and 51 are respectively pivotally connected as by means of bolts 52. The inner ends of the tie rods 50 and 51 are pivotally connected to the lower leg of a U-shaped member 53 by means of a bolt 54. The upper leg of the U-shaped member 53 is secured to and mounted upon a support member 55 journalled coaxially upon and about the upper end of the guide wheel spindle 14. A bolt 56 is used for connecting the U-shaped member 53 with the support member 55.

It will be noted that should the support member 55 and the U-shaped member 53 rigidly connected therewith, be pivoted about the vertical axis in the guide wheel spindle 14, the tie rods 50 and 51 would be moved endwise in one direction or the other depending upon the direction in which the parts 53 and 55 are pivoted or oscillated, and that this endwise movement of the tie rods will operate through the steering arms 49a of the steering knuckle members 28 to pivot the latter about the vertical spindles 46 whereby the cultivating instrumentalities are swung laterally relatively to the crop row.

Means is provided for connecting the U-shaped member 53 with the steering mechanism of the machine whereby such pivotal movement of the parts 53 and 55 about the vertical axis in the guide wheel spindle 14 can be effected by manipulating said steering mechanism. This connection comprises an arm 57, Figs. 1 and 2, of which the hub or shank portion surrounds and is nonrotatively secured to the guide wheel spindle 14 by means of a set screw 58. A notch 59 in the forward end of the arm 57 comprises a part of a latch mechanism of which the other part consists of an arm 60 extending downwardly through slots 61 and 62 in the legs of the bracket 53 and having its lower end pivotally connected by means (not shown) upon the lower side of said lower leg. A spring S having opposite of its ends connected respectively with an intermediate portion of the arm 60 and with the bolt 56 normally urges the upper end of said arm backwardly for placing a section of said arm within the notch 59 of the arm 57. When the arm 60 is in this latching relation with the notch 59 these parts mobilize or complete the operating connection between the guide wheel spindle 14 and the steering knuckle members 28 wherefore upon oscillative movement of said spindle the U-shaped member and the support member 55 will be caused to move in unison with the arm 57 and said spindle for imparting the aforesaid endwise movement to the tie rods 50 and 51.

Fluid from the pumps P or P' is also employed for operating a second motor, 120, Figs. 1 and 3 which I employ for unlatching the latch mechanism comprising the notch 59 in the arm 57 and the pivoted arm 60. The motor 120 is carried between uprights legs 121 and 122 of a bracket 123 of which the base is secured to the U-shaped member 53 as by welding or by a bolt. Universal joint means is used for mounting the motor upon said bracket. This universal joint means includes a rectangular band 124 having opposite of its sides 125 and 126 pivotally connnected with the legs 121 and 122 by trunnion bolts 127. Backwardly extending apertured ears 128 respectively in the upper and lower sides of the member 124 are traversed by pivot pins 129 upon which apertured ears 130 at opposite edges of the back cylinder head 131 of the motor 120 are pivoted. The motor 120 includes a cylindrical side wall 132 having the cylinder head 131 at its back end and a cylinder head 133 at its forward end. For long bolts 134 extend lengthwise of the motor, exteriorly of the cylinder 132 and through openings in edge portions of the cylinder heads 131 and 133 for clamping such cylinder heads firmly onto the ends of the cylinder. Cylinder head 131 is provided with a threaded opening (not shown) for receiving a nipple 136 to which one end of a conduit 137 is connected. The opposite end of the conduit 137, shown in Figs. 4, 6 and 7, is connected with the T-coupling member 104 previously described. A piston 138 reciprocal within the cylinder 132 operates a piston rod 139 connected therewith and extending outwardly through an opening 140 in the cylinder head 133. The forward end of the piston rod 139 is pivotally connected to the upper end of the latch arm 60 by means of a bifurcated head 141, adjustable axially of the piston rod, and a pivot pin 142 traversing the upper end of the arm 60 and the opopsed legs of said head 141.

In the operation of the machine, the control rod 108 will normally occupy the position shown in Figs. 6 and 4 so that fluid under pressure will not be supplied to either of the motors 72 and 120; the thrust rods, of which one is shown in Figs. 1 and 4, 38 will be in their rearmost position due to the force of the springs 86 and to the weight of the cultivating instrumentalities, wherefore the latter will be in the cultivating zone; and the latch arm 60 will be held by the spring S in the notch 59 of the latch arm 57 for completing the operable connection between the machine steering mechanism and the cultivating instrumentalities. Should the cultivating instrumentalities veer too close to the crop rows at one side, correction is made by turning the guide wheels 13 in the direction to guide the machine oppositely to the direction of such veering, and, pursuant to rotation of the guide wheel spindle 14 in the execution of this turning of the guide wheels, the arm 57 and the U-shaped member 53 latched thereto are rotated to move the tie rods 50 and 51 in the direction to shift the instrumentalities in the direction the vehicle is steered. The length of the knuckle arms 49a and the distance between the axis in the spindle 14 and pivot bolt 54 for connecting the tie rods 50 and 51 with the U-shaped member 53 are so chosen that little rotation of the spindle 14 will cause relatively great displacement of said instrumentalities. While this construction makes it necessary to manipulate the steering mechanism but little to guide the instrumentalities as desired along the crop rows, it becomes necessary to disconnect the steering mechanism from said instrumentalities when making a sharp turn with the machine, so steering manipulation will be untrammelled at that time. When the end of the crop row is reached the operator pulls upwardly and backwardly upon the control stem 108 to manipulate the valve 93, Fig. 6, for delivery of pressure fluid simultaneously through the conduits 91 and 137 to the motors 72 and 120. The diameter of the cylinder 132 and of the piston 138 in the motor 120 is sufficient for this motor to develop power at relatively low pressure for substantially instantaneous release of the latch arm 60 from the notch 59 in arm 57, thereby freeing the steering mechanism from the cultivating instrumentalities so it may be manipulated for turning the guide wheels 13 sharply in executing a turning about for starting back across the field along different crop rows. Since the motor 120 operates practically instantaneously, the operator can wait until the ends of the crop rows are reached before operating the control stem 108, wherefore the cultivating instrumentalities need not be lifted prematurely in order to have the steering mechanism released from the cultivating instrumentalities in time to execute the turning about. Eventually the pressure of fluid delivered by the motor P into the conduits 91 and 137 is sufficient for operating the motor 72 for raising the cultivating instrumentalities, and this raising thereof may take place during the initial part of the turning about since normally there will be no crop to be injured thereby in the extreme end zones of the field.

After the machine is turned about preparatory to starting back along different rows, the control rod 108 is moved back to the position shown in Figs. 4 and 6, setting the valve so that pressure fluid can escape through the port 96, a groove 143 in the valve core, a port 144 in the valve casing and a conduit 145 leading to the low pressure source of fluid for the pump P. The motors 72 and 120 are thus de-energized wherefore the cultivating instrumentalities lower to the cultivating tote and the spring S reengages the latch arm 60 in the notch 59 of the arm 57. Thereafter, the instrumentalities are operable and are manipulatable by the steering mechanism as above described.

Means are also provided to lock the U-shaped member 73 and its associated parts in a fixed position so that the shovels 20 or other tools may be maintained in a fixed position while the tractor is being driven from place to place. Such means also will lock the shovels or other tools in a position adaptable for cultivating long straight rows where the operator can see that there is no necessity for manipulating the position thereof. Such means comprise a pivot lock 150 in the form of a bar which is pivotally mounted on the cross beam 16 by means of a bolt 151. The bent over end of the pivot lock 150 is adapted to fit into an aperture 152 in the U-shaped member 73 to lock it in the forward position. At such times when the pivot lock is used, the arm 60 is blocked in its unlatched position by suitable means, such as a block of wood or a cotter pin, so that the spindle 14 may be manipulated without affecting the position of the U-shaped member 73 and its associated parts, including the shovels 20.

Should the motor and clutch assembly shown in Fig. 7 be used instead of that in Fig. 6, the operator would manipulate the control rod 158 in the same manner as the control rod 108 is manipulated. While the clutch C is engaged, the pump P will deliver pressure fluid for actuating the motors 72 and 120 and when said clutch is disengaged the fluid will escape back through the pump for deenergizing the motors.

While I have herein shown and described preferred embodiments with the view of fully illustrating the invention, it should be understood that the invention extends to other forms, arrangements, structures and details falling within the scope and spirit thereof and not sacrificing all of its material advantages.

I claim:

1. In a dirigible agricultural machine wherein there is a crop cultivating instrumentality releasably connected with steering mechanism of the machine for adjustment relatively to the crop within a cultivating zone in accordance with steerage manipulation of said mechanism; the combination of power-operated displacing means operable to displace said instrumentality from said zone, control means manipulatable for causing operation of said displacing means, and power-operated releasing means operable to release the connection of said instrumentality with the steering mechanism, said releasing means also being under control of said control means to be caused thereby to operate coordinately with the manipulation thereof for initiating operation of the displacing means.

2. In a dirigible agricultural machine wherein there is a crop cultivating instrumentality releasably connected with steering mechanism of the machine for adjustment relatively to the crop within a cultivating zone in accordance with steerage manipulation of said mechanism; the combination of power-operated displacing means operable to displace said instrumentality from said zone, control means manipulatable for causing operation of said displacing means, and releasing means operable substantially instantaneously to release the connection of said instrumentality with the steering mechanism, said releasing means being under control of said control means and caused thereby to operate coordinately with manipulation of said control means for initiating operation of the power-actuated means.

3. In a dirigible agricultural machine wherein there is a crop cultivating instrumentality releasably connected with steering mechanism of the machine for adjustment relatively to the crop within a cultivating zone in accordance with steerage manipulation of said mechanism; the combination of displacing means operable to displace said instrumentality from said zone, releasing means operable to release the connection between said instrumentality and the steering mechanism, a common control means for instituting the operation of said displacing means and said releasing means, and means establishing a predetermined operable relation between said displacing means and releasing means and in which the releasing means is operable to effect such release prior to substantial displacement of said instrumentality.

4. In a machine of the class described wherein a crop cultivating instrumentality is releasably connected with steering apparatus and is displaceable from a crop cultivating zone; the combination of motor means associated with the connection between said instrumentality and said steering mechanism and operable when energized to disrupt said connection, a second motor means connected with said instrumentality and operable when energized to displace said instrumentality from the cultivating zone, and means for causing operation of the first motor means to effect release of said connection prior to operation of the second motor means effecting substantial displacement of said instrumentality, comprising a control common to said motor means for controlling the energization thereof.

5. In a dirigible agricultural machine wherein there is a crop cultivating instrumentality releasably connected with steering mechanism of the machine for adjustment relatively to the crop within a cultivating zone in accordance with steerage manipulation of said mechanism; the combination of a fluid-pressure responsive motor operably associated with the connection between the steering mechanism and said instrumentality and operable to release said connection when subjected to a fluid pressure differential, a second fluid-pressure responsive motor operably associated with said instrumentality and operable to displace said instrumentality from the cultivating zone when subjected to a fluid pressure differential, a source for fluid at predetermined pressure to create the aforesaid pressure differential with respect to said motors when they are subjected to such fluid, and means for causing operation of the first motor prior to substantial operation of the second motor, comprising control means manipulatable to subject each of said motors to the pressure of the fluid at said source.

6. In a machine of the class described wherein a crop cultivating instrumentality is releasably connected with steering apparatus and is displaceable from a crop cultivating zone; the combination of a fluid-pressure responsive motor operably associated with the connection between the steering mechanism and said instrumentality and operable to release said connection when subjected to a fluid pressure differential, a second fluid-pressure responsive motor operably associated with said instrumentality and operable to displace said instrumentality from the cultivating zone when subjected to a fluid pressure differential, a source for fluid at predetermined pressure to create the aforesaid pressure differential with respect to said motors when they are subjected to such fluid, and control means manipulatable for concurrently subjecting said motors to the pressure of fluid at said source, and the first motor being operable by less pressure differential than the second motor whereby the first motor operates first, upon such manipulation of the control means, to cause release of said connection between the steering mechanism and said instrumentality prior to substantial displacement of said instrumentality from the cultivating zone.

7. In an agricultural machine including a steering mechanism having a movable part to which movement is imparted in accordance with steerage manipulation of said mechanism, and a cultivating instrumentality; the combination of connecting means releasably connectible between the steering mechanism and said instrumentality for causing adjustment of said instrumentality in accordance with steering manipulation of said mechanism, said connecting means comprising a tie-rod connected with said instrumentality, complemental latch members respectively associated with said tie-rod and with said movable part of the steering mechanism and operable, when engaged, to connect said connecting means for operation as aforesaid between the steering mechanism and said instrumentality, one of said latch members being movable between positions respectively in and out of such engagement with the other, spring means biasing said one latch member toward one of said positions and a fluid-pressure responsive motor connected with said one latch member and operable to move said latch member into the other of its positions when subjected to operating fluid.

8. In an agricultural machine having an upright spindle oscillative with and pursuant to pivotal adjustment of a guide wheel of such machine, and a cultivating instrumentality to be adjusted in accordance with oscillative movement of said spindle; the combination of means for effecting an operative connection between said spindle and said instrumentality to cause adjustment of the latter in accordance with oscillative movement of the spindle, comprising a spindle extension member oscillative with said spindle, a support member adjacently to the extension member and journalled substantially coaxially of the spindle so rotation of the spindle relatively thereto can occur, latch means including parts respectively on the extension and support members and engageable to cause said members to oscillate together with the spindle, and means connecting the support member with the cultivating instrumentality to cause the aforesaid adjustment of said instrumentality when said support member is latched by said parts to the spindle extension member, and means for disabling said connection comprising a fluid-pressure responsive motor, a universally pivotal mount for said motor upon said support member, and an operative connection between said motor and the latch part on said support member to shift said latch part from engagement with the part on the spindle extension member when said motor is subjected to the pressure of operating fluid therefor.

CECIL G. DOTY.